US008185405B2

(12) United States Patent
Van Court

(10) Patent No.: US 8,185,405 B2
(45) Date of Patent: May 22, 2012

(54) METHOD, SYSTEM, AND PROGRAM PRODUCT FOR INFORMATION EDITORIAL CONTROLS

(76) Inventor: Chuck Van Court, Bellevue, WA (US)

( * ) Notice: Subject to any disclaimer, the term of this patent is extended or adjusted under 35 U.S.C. 154(b) by 788 days.

(21) Appl. No.: 12/267,559

(22) Filed: Nov. 8, 2008

(65) Prior Publication Data

US 2009/0292548 A1    Nov. 26, 2009

Related U.S. Application Data

(60) Provisional application No. 61/054,479, filed on May 20, 2008.

(51) Int. Cl.
*G06Q 10/00* (2012.01)
(52) U.S. Cl. ......................................... 705/1.1
(58) Field of Classification Search .................. None
See application file for complete search history.

(56) References Cited

U.S. PATENT DOCUMENTS

| | | | |
|---|---|---|---|
| 6,560,589 B1 | 5/2003 | Stier | |
| 7,031,952 B1 | 4/2006 | Heumann | |
| 7,143,089 B2 | 11/2006 | Petras | |
| 7,266,535 B1 | 9/2007 | Nelken | |
| 2002/0023093 A1* | 2/2002 | Ziff et al. | 707/104.1 |
| 2004/0044542 A1 | 3/2004 | Beniaminy | |
| 2006/0242554 A1* | 10/2006 | Gerace et al. | 715/501.1 |
| 2007/0198506 A1 | 8/2007 | Attaran | |
| 2007/0219795 A1 | 9/2007 | Park | |
| 2007/0219863 A1 | 9/2007 | Park | |
| 2007/0219958 A1 | 9/2007 | Park | |
| 2007/0244906 A1 | 10/2007 | Colton | |
| 2007/0282680 A1 | 12/2007 | Davis | |
| 2007/0282842 A1 | 12/2007 | Messina | |
| 2008/0005095 A1 | 1/2008 | Horvitz | |
| 2009/0157490 A1* | 6/2009 | Lawyer | 705/11 |
| 2009/0157491 A1* | 6/2009 | Brougher et al. | 705/11 |
| 2009/0157667 A1* | 6/2009 | Brougher et al. | 707/5 |
| 2009/0165128 A1* | 6/2009 | McNally et al. | 726/21 |

\* cited by examiner

*Primary Examiner* — Jonathan Ouellette
(74) *Attorney, Agent, or Firm* — Ariel S. Bentolila; Bay Area IP Group, LLC

(57) ABSTRACT

A method for information editorial controls includes a group of members in an online community receiving authorization a category of editorially-controlled content. A first editor of the group in the online community receives authorization to the category of editorially-controlled content. A member of the group rates published comments within a predefined range. A contributing member of the group submits additional comments. The first editor reviews the additional comments to determine suitability for incorporation into the category of editorially-controlled content and determines whether to award points to the contributing member within a predefined range. The first editor incorporates suitable additional comments into the category of editorially-controlled content and publishes an edited category of editorially-controlled content wherein the suitable additional comments improves the content of the category. Members of the group receive contribution points based in part on their awarded points and rating of their published comments.

42 Claims, 16 Drawing Sheets

Figure 2A

Advanced Publishing Options

Close Window

201 — Publishing Tier ?
Select the categories, statuses and tier level for which the user has publishing privileges. Changes will not take effect until you press "Save Changes" on the edit user page.

⦿ Tier-1 Publisher ◯ Tier-2 Publisher ◯ Tier-3 Publisher    Mass Change Widget

203 — Publishing Item Status ?
☑ Public Items ☑ Special Public Items ☑ Private Items ☑ Special Private Items 205 — Publishing Categories ?

☐ About City Credit Union Find out more about us, employment opportunities and how to contact us. 2085 [Public]

209 —☐ About Credit Unions Interesting facts and figures about credit unions. 2043 [Public]  | Tier-3 ☑ |—207

213 —☐ Board Material Information supporting board meetings. 2176 [Special Public]

☐ Contact Us How to contact us by phone, by mail, by email or in person. 2038 [Public]  | Tier-1 ☑ |—211

☐ Employment Opportunities What jobs we have open and how to apply. 2007 [Public]

☐ All City Blog Sound off on issues here! 2162 [Public]

☐ Bonus Programs Information supporting the bonus program available to senior management staff. 2177 [Special Private]

☐ Branch and ATM Information Where they are, when they're open and how to get there. 2076 [Public]

Figure 2B

220 — ☑ View Special Public items. Privilege needed to view knowledge base items with a Special Public status.
    222 — ☐ Limited Categories *

225 — ☑ View Special Private items. Privilege needed to view knowledge base items with a Special Private status.
    227 — ☐ Limited Categories *

Figure 2C

Limited Category Selection     Close Window

229

Select the categories in which this user has special public access. Changes will not take effect until you press Save Changes on the Edit User page.

230 — ☐ About City Credit Union Find out more about us, employment opportunities and how to contact us. 2086 [Public]

232 — ☐ About Credit Unions Interesting facts and figures about credit unions. 2043 [Public]

☐ Board Material Information supporting board meetings. 2176 [Special Public]

☐ Contact Us How to contact us by phone, by mail, by email or in person. 2088 [Public]

☐ Employment Opportunities What jobs we have open and how to apply. 2007 [Public]

☐ All City Blog Sound off on issues here! 2162 [Public]

235 — ☐ Bonus Programs Information supporting the bonus program available to senior management staff. 2177 [Special Private]

☐ Branch and ATM Information Where they are, when they're open and how to get there. 2076 [Public]

☐ Calculators Calculators to help you make the best decision for you and your family. 2017 [Public]

Figure 2D

Limited Category Selection        <u>Close Window</u>

Select the categories in which this user has special private access. Changes will not take effect until you press Save Changes on the Edit User page. 240

242 — ☐ About City Credit Union Find out more about us, employment opportunities and how to contact us. 2066 [Public]
     244 — ☐ About Credit Unions Interesting facts and figures about credit unions. 2043 [Public]
     246 — ☐ Board Material Information supporting board meetings. 2176 [Special Public]
         ☐ Contact Us How to contact us by phone, by mail, by email or in person. 2083 [Public]
         ☐ Employment Opportunities What jobs we have open and how to apply. 2097 [Public]
☐ All City Blog Sound off on issues here! 2162 [Public]
248 — ☐ Bonus Programs Information supporting the bonus program available to senior management staff. 2177 [Special Private]
☐ Branch and ATM Information Where they are, when they're open and how to get there. 2076 [Public]
☐ Calculators Calculators to help you make the best decision for you and your family. 2017 [Public]

Figure 5

Created: 1:30 PM on 9/1/2007   Updated: 8:30 PM on 10/1/2007   Content Editor(s): E. Cairns, K. Nelson, B. Jones 505

Content Rating: 9.4 out of 10   Comments: 3   ☑ Rate  Comment only   Sort comments by: [Date Posted Desc ▼]

---

E. Cairns   Editor   Posted: 7:30 PM on 10/1/2007   Approved: 1:30 PM on 10/1/2007

I was thinking that we should consider updating the content to include more information about what items other than checks can be returned. What do you folks in the community think about expanding this content? 533

527

---

Mississippi   Contribution Points: 130   Rating: 9   Posted: 9:50 AM on 10/1/2007   Approved: 9:50 AM on 10/1/2007

Points Awarded: 9   Points you awarded: 1 ? 535
                                            537

529   Returned items can be confusing and I think that this article is helpful to people

---

Judy the kid   Contribution Points: 500   Rating: 6.0   Posted: 9:50 AM on 10/1/2007   Approved: 7:50 AM on 10/1/2007
                                                    521  519                                                       523
525
Points Awarded: 40  👍   Points you'd award: -2-:      50
               516                                    ━━━
                                                  20  32    511
513                                                      
515 — What about xxxxxxx. Wouldn't that also cause an check to be returned?

Editor E. Cairns says:  Great catch Judy. I will be updating the content to include that xxxx will also cause an item to be returned.                                                                                                          537

Figure 6

Knowledge Item Comments Requiring Evaluation

Please review each comment carefully to determine if the comment should be integrated into knowledge item content or not.

Note: If you choose to incorporate a comment into a KB item, only one kb item can be edited at a time. However, you can select multiple comments for the same KB item. Once you submit your changes, you will be redirected to the Make Knowledge page where you will be able to view your selected comments and edit the KB item. When you incorporate the comments and save the KB item, you will be redirected back to this page to perform other KB edits if necessary.

[601] Get Comments    [603] (Enter KBID)    [627] Submit Comments

| [605] KBID | [607] Date Submitted | [609] Submitted by | [611] Approved by | Comment [615] | [621] Rating | [628] Exclude from External Users | [625] Action |
|---|---|---|---|---|---|---|---|
| 11282 | 2/29/2008 10:15 AM | Mississippi (External) | Kevin Nelson on 2/29/2008 | Comment 1 / 615  0—5—10 /617  Publisher Notes /619 | 5 | ☐ | ○ No Action Necessary<br>○ Use to edit KB Item<br>○ Reject Comment |
| 11282 | 2/29/2008 1:15 PM | Pub 1 (Internal) | Sue Smith on 2/29/2008 | Comment 2 / 615  0—5—10 /617  Publisher Notes /619 | 5 | ☐ | ○ No Action Necessary<br>○ Use to edit KB Item<br>○ Reject Comment |
| 11719 | 2/29/2008 3:15 PM | Suzie J (External) | Kevin Nelson on 2/29/2008 | Comment 3 / 615  0—5—10 /617  Publisher Notes /619 | 5 | ☐ | ○ No Action Necessary<br>○ Use to edit KB Item<br>○ Reject Comment |

Figure 8

| Total Points Earned | Contributor | Type of User | Points for New Content | Points for Content Revisions | Points for Comments Used to Improve Content | Points for General Comments |
|---|---|---|---|---|---|---|
| 807 | 809 | 811 | 813 | 815 | 817 | 819 |

Top Contributors 803

Category Displayed: [All Categories ▼] 801   Time Period Points Earned: [Forever ▼]   Group(s): [All ▼] 805

Click on Column to sort by column

METHOD, SYSTEM, AND PROGRAM PRODUCT FOR INFORMATION EDITORIAL CONTROLS

CROSS-REFERENCE TO RELATED APPLICATIONS

The present Utility patent application claims priority benefit of the U.S. provisional application for patent Ser. No. 61/054479 filed on 20 May 2008 under 35 U.S.C. 119(e) having the same title as the present application. The contents of this related provisional application are incorporated herein by reference for all purposes.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to customer relationship management (CRM) and knowledge base management providers. More particularly, the invention relates to extending the metrics and supporting management tools to motivate, facilitate and identify communities of people to participate in directly improving and creating content that by its very nature and usage requires editorial controls beyond what can be provided by the community of people using the content itself.

BACKGROUND OF THE INVENTION

The Internet has made access to content anywhere in the world only a click away and new technologies, known as Web 2.0 technologies, have changed how content is created. Instead of being created by a restricted number of people and then edited and highlighted when deemed important by an editorial staff, control over content is now often placed in the hands of the community of people actually using the content.

Digg, Facebook and Myspace are all examples of web sites providing access to community-controlled content. Digg is generally focused on extending content that one would find in a newspaper or magazine, while Myspace and Facebook are more about providing a place for community members to share information amongst other people with whom they wish to interact.

Another widely used example of community-controlled content is Wikipedia, which provides an online dictionary by leveraging what is commonly referred to as Wiki technologies. Wiki technologies not only enable users to create their own content like Digg and the other community web sites previously mentioned, these technologies also enable users to make changes to the content created by other users.

Forum technologies and Wiki Technologies are similar and the line between them continues to fade, but Forum technologies generally do not allow community members to change content created by other community members like is allowed in Wiki technologies. Both Wiki and Forum technologies are also becoming more popular as a method for companies to extend more control over content to staff and external users of the content.

With limited resources and tight budgets, this transition of control over the content to community members can have many advantages. In addition to the potential cost savings of outsourcing the role of authors and editors to inexpensive and generally free community members, the actual users of the content are in the best position to surface relevant content and in aggregate to determine what content is the most important and deserves greatest visibility.

Community-controlled content has proven to be very effective in cases where no one directly or indirectly is held accountable for how accurate the content is or how well it is written. No one thinks lesser of the owners of these community-controlled content sites for bad articles, and the only matter that these companies are truly held accountable for is to take steps to control content that a material number of community members would find offensive.

Conversely, other content on the Internet is directly attributable to an organization, and readers of the content should and do hold the content owners accountable for their content. As an example, content about a product or service that is used by content users to make decisions clearly must be accurate and understandable. Even content that only voice an opinion should be a clear reflection of an organization's brand and may impact consumer perceptions of the organization owning the content. Content of this nature, with these accountabilities and significant implications to an organization, typically must go through editorial controls enforced by people authorized by an organization for being a representative of said content. Unlike community-controlled (CC) content, editorially-controlled (EC) content must be subject to varying degrees of editorial controls that are commensurate with exposure associated with said content before being made available for consumption by the community of people using the content.

Currently, technology does not exist that enforces the necessary editorial controls while facilitating and motivating members of the community to interact with each other and relevant authorized content editors to continually evolve and improve EC content. Without community participation to continually and actively evolve EC content, the vast majority of content does not remain effective or relevant over time to the people using the content. Common problems with content not subject to active community involvement for evolving the content include, without limitation, the content becoming outdated, not containing all relevant considerations for the user of the content, not including content important to the people using the content, and having errors in format, grammar, and content accuracy.

Other existing technologies do nothing to facilitate and motivate community evolvement toward the evolution and improvement of EC content. Existing technologies often facilitate community conversation, and community members can award points to people for the value of their insights shared. However, no existing technology enables community members to work with content editors to improve and add to EC content.

A known solution to maintain the quality and accuracy of content is commonly referred to as knowledge bases. Knowledge bases are a part of knowledge management technology, which generally provides editorial controls over the content. However knowledge bases do nothing to facilitate open collaboration among community members using and editing the content to improve the EC content, and knowledge bases do not motivate people using the content to participate in improving the EC content.

Another current solution is described as an Internet system assisting and motivating a population of users interested in information about certain categories of subjects to automatically maintain the database content and to improve the usefulness and quality of the database information without any substantial management by the website owner-manager. However, this solution does not help pre-defined editors responsible for maintaining EC content. The present solution awards contribution points. However, the solution does not facilitate editors and other community members in awarding contribution points within pre-defined ranges commensurate with the value of the contribution in improving the EC content as perceived by the content editors and other community members using the content.

In view of the foregoing, there is a need for improved techniques for extending the metrics and supporting management tools to motivate, facilitate and identify communities of people, both internal and external to an organization, to participate in directly improving and creating content that by its very nature and usage requires editorial controls beyond what can be provided by the community of people using the content itself.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A, illustrates an exemplary advanced publishing options web page used to define editorial responsibilities, or publishing rights, for a given user, in accordance with an embodiment of the present invention;

FIGS. 2B, 2C and 2D illustrate exemplary advanced access rights web page used to define who can see what specific content, in accordance with an embodiment of the present invention.

FIG. 5 illustrates an exemplary web page displaying comments made by community members about a particular item of content, in accordance with an embodiment of the present invention;

FIG. 6 illustrates an exemplary web page where approved comments that require review are processed by editors, in accordance with an embodiment of the present invention;

FIG. 8 illustrates an exemplary web page of top contributors, in accordance with an embodiment of the present invention;

Figure 1A:
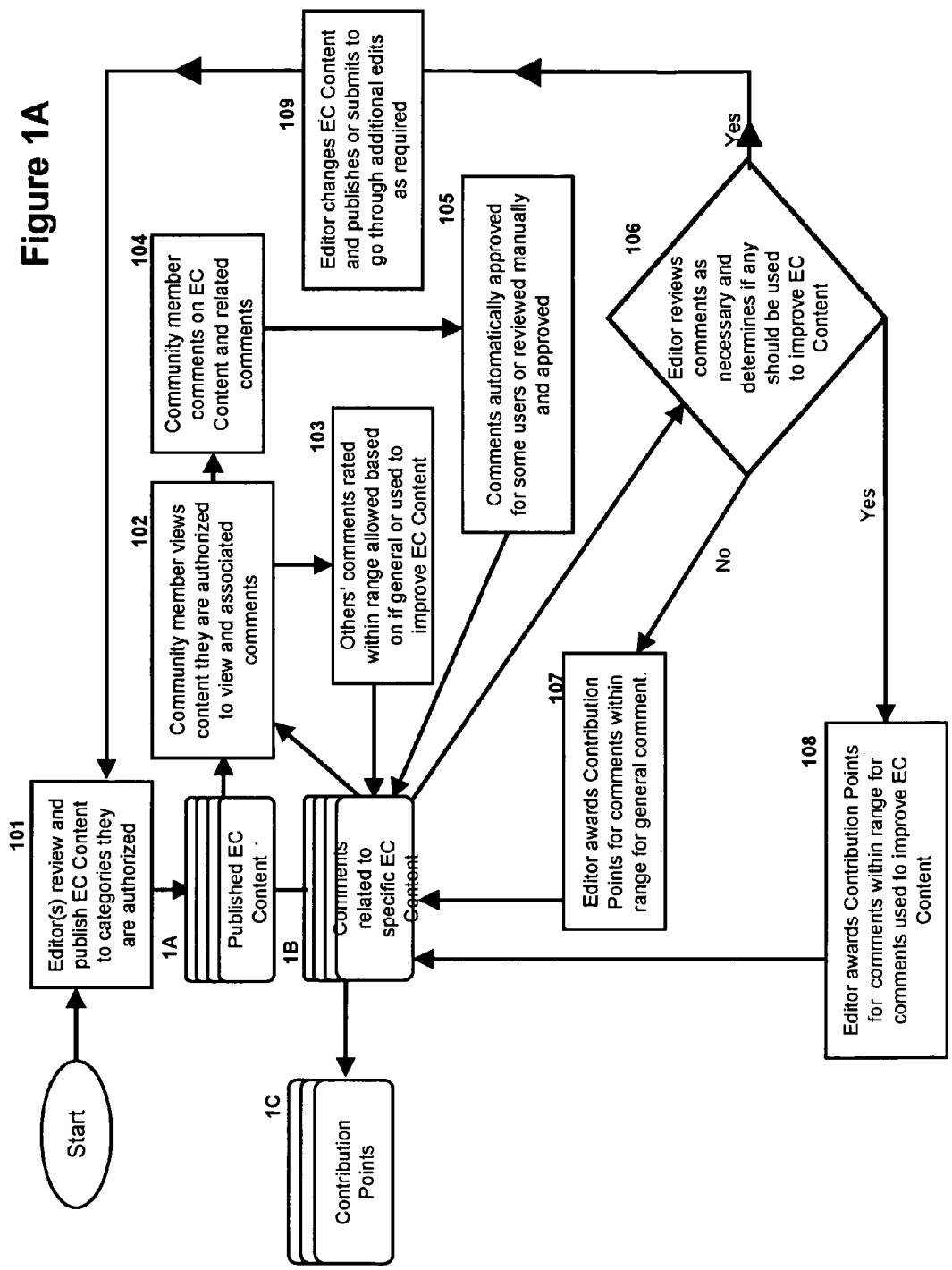
FIGS. 1A, 1B and 1C are flowcharts illustrating alternative and exemplary workflows for an exemplary system for providing EC content, in accordance with an embodiment of the present invention.

Unless otherwise indicated illustrations in the figures are not necessarily drawn to scale.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

The preferred embodiment of the present invention engages and motivates broad groups of people who may be internal and/or external to an organization to create and evolve editorially-controlled (EC) content, while preserving the editorial controls warranted based on how the content is used and who uses the content. The preferred embodiment also systematically and naturally identifies subject matter experts for specific subject matter domains based on the perceived value of the actual contributions of these experts in creating and evolving EC content relevant to these subject matter domains. Some embodiments may be a component of a customer care application and may utilize knowledge base technology to derive these benefits; however other embodiments may utilize any file or database technology.

Unlike other Web technology used to facilitate dialog among community members about content, the preferred embodiment creates the necessary ecosystem to facilitate and motivate people using the content to actually improve the content. The dialog itself provides useful information; however, the extraction of insights from the dialog to actually improve the EC content is a focus of the preferred embodiment.

The preferred embodiment of the present invention comprises several known and new functionalities that, when combined, provide previously unavailable capabilities to generally ensure that digitally stored and editorially controlled content is continually evolving based on the insights from the community of people applying the content for real world application. Content editors generally know the subject matter of the content and how and who uses the content; however the people charged to apply the content to make decisions have practical insights for the effectiveness of the content and how the content must evolve to add the greatest possible value. Using current content management methods, EC content often becomes outdated and inaccurate since people with a practical and ongoing need to use the EC content generally do not contribute to improve the EC content because it is not easy to do so and they typically have no motivation to do so.

Usage of community-based software, including, but not limited to, wikis and forums, has been and will continue to be used to openly enable community members to generate content where the possibilities for inaccuracies and poor writing, even if for only a few hours or even minutes, are acceptable and have no real adverse consequence to the organizations extending content using these types of solutions. In fact, these community-based software solutions can sometimes provide the basis for EC content, providing the raw materials for a finished product.

Preferred embodiments of the present invention motivate and facilitate people to share their knowledge to the benefit of the community by providing highly visible recognition, which can in itself serve as a self-motivator for people or be further leveraged by management in various incentive programs. Preferred embodiments stimulate synergistic collaboration among community members to drive out knowledge that otherwise would not be surfaced, or at least would take much longer to surface. Preferred embodiments enable more accurate, thorough and pertinent content to be available and therefore enable users to make better and faster decisions concerning this content. It is contemplated that preferred embodiments will reduce costs and increase sales by enabling staff and consumers to gain access to content at any time using only a web browser and by providing a single and comprehensive source of highly searchable content that is accurate and continually evolves based on how the content is actually used.

A relatively basic embodiment of the present invention enables people in an online community to make and view comments about specific EC content and to earn a quantifiable metric that varies based on the extent to which the contribution improves the value of the EC content as perceived by the editors and community of people using the content. Points awarded by community members for general comments are common in many web 2.0 implementations today.

It should be appreciated that although some components of various embodiments of the present invention may be individually known to those skilled in the art, the combination of such components in such embodiments provide systems for presenting and controlling EC content that are not currently available in the very active and competitive web market utilizing community including, without limitation, wiki, knowledge base and other customer care related technologies that will clearly benefit and profit from embodiments of the present invention.

FIG. 1A is a flowchart illustrating an exemplary workflow for an exemplary system for providing EC content, in accordance with an embodiment of the present invention. In step 101 an editor or multiple editors review and publish EC content to the categories for which the editors are authorized. The EC content is published at step 1A. Once the EC content is published, community members may view the content and any associated comments that have been approved as required and they are authorized to view in step 102. Step 1B represents comments related to specific EC content. After viewing the EC content and comments, a community member may rate the comments made by others in step 103, or the community member may post comments about the EC content and related comments in step 104. In step 103 the rating of comments may be based on various factors such as, but not limited to, if the comment is a general comment or if the comment may be used to improve the EC comment. Editors or system administrators may set a range for rating comments, for example, without limitation, rating the comment out of ten points, five stars, etc. Ratings of comments made in step 103 are published with comments at Step 1B. Comments made by community members in step 104 are approved as required in step 105. These comments may be automatically approved for some community members while comments from other community members may be reviewed manually. At this step offensive language or subject matter is the main reason for not approving comments. Once a comment is approved in step 105 it is published in comments at step 1B. Comments that are rejected by an editor are marked as rejected for later potential review and are not viewable by non-editors. When rejecting comments, editors also have an option of sending communications to the person making the comments as to why the comments were rejected.

In step 106 the editors review comments from step 1B as necessary to determine if any of comments 1B may be used to improve EC content from step 1A. This comment review can be required for all comments, comments from some users or only comments whose ratings by community members exceeds predefined thresholds.

If when reviewing the comment an editor determines that a comment will not be used to improve EC content of step 1A in step 106, the editor awards the community member who posted the comment in step 107 with contribution points within a range determined for general comments and the awarded points are posted in the contribution points table of step 1C.

If when reviewing the comment an editor determines that a comment will be used to improve EC content of step 1A in step 106, the editor awards the community member who posted the comment in step 108 with contribution points within a range determined for comments used to improve EC content in the contribution points table of step 1C. The editor also flags the comment and provides comments to the person making the comments used to improve the content as shown in section 537 within FIG. 5. Then in step 109, the editor changes the EC content in accordance with the comment and then publishes the changed EC content in EC content of step 1A or submits the EC content to go through additional edits as required in step 101.

Figure 1B:
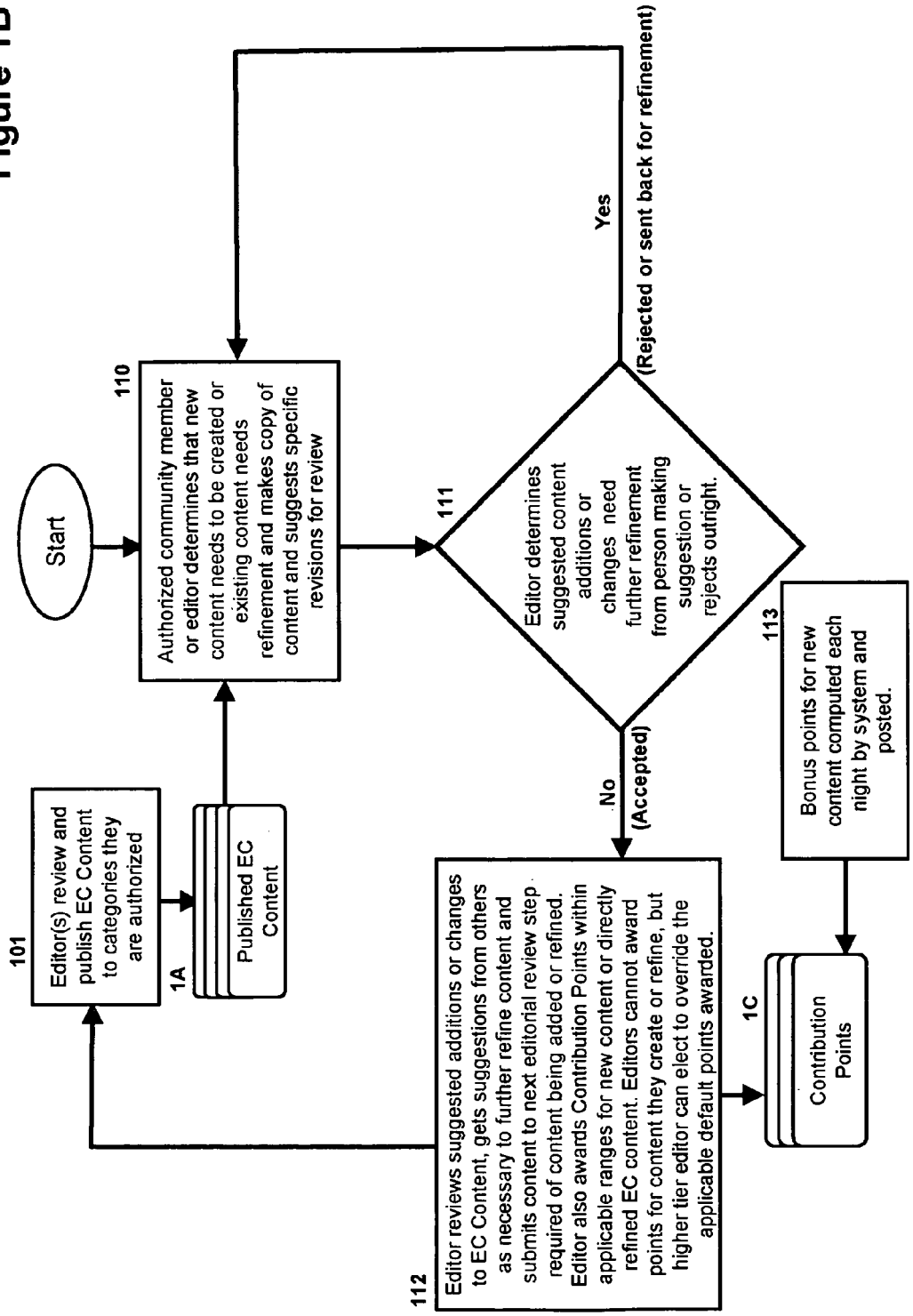

FIGS. 1B is a flowchart illustrating an alternative and exemplary workflow for an exemplary system for providing EC content, in accordance with an embodiment of the present invention. At step 110, an authorized community member or editor may make a copy of published content from EC content 1A and suggest specific revisions for the content. Also, in step 111, an authorized community member or editor may create new content and submit this content for review. Once the suggested revisions or new content is submitted, an editor reviews the suggestions in step 112 and, if the revision or new content is workable, revises existing content or publishes the new content in EC content of step 1A or submits the revision or new content to go through additional edits as required in step 101. Content that is not deemed ready for publication workable by the editor is sent back to the author for further revision before being reviewed by the editor. Furthermore, the editor may define contribution points within an applicable range to the community member who submitted the revision or new content in step 112, but the points are not actually awarded until the content has gone through the applicable edits and has been published. Editors may not award contribution points for content that they created or revised; however, a higher tier editor may elect to override an applicable number of default contribution points for the contributing editor.

At step 113, bonus contribution points may be computed for people who are allowed to submit new EC content. Bonus contribution points are awarded if the new content created and published is viewed by community members in excess of the thresholds defined for bonus contribution points for newly created content. Step number IC represents the contribution points awarded to community members for new content.

Figure 1C:
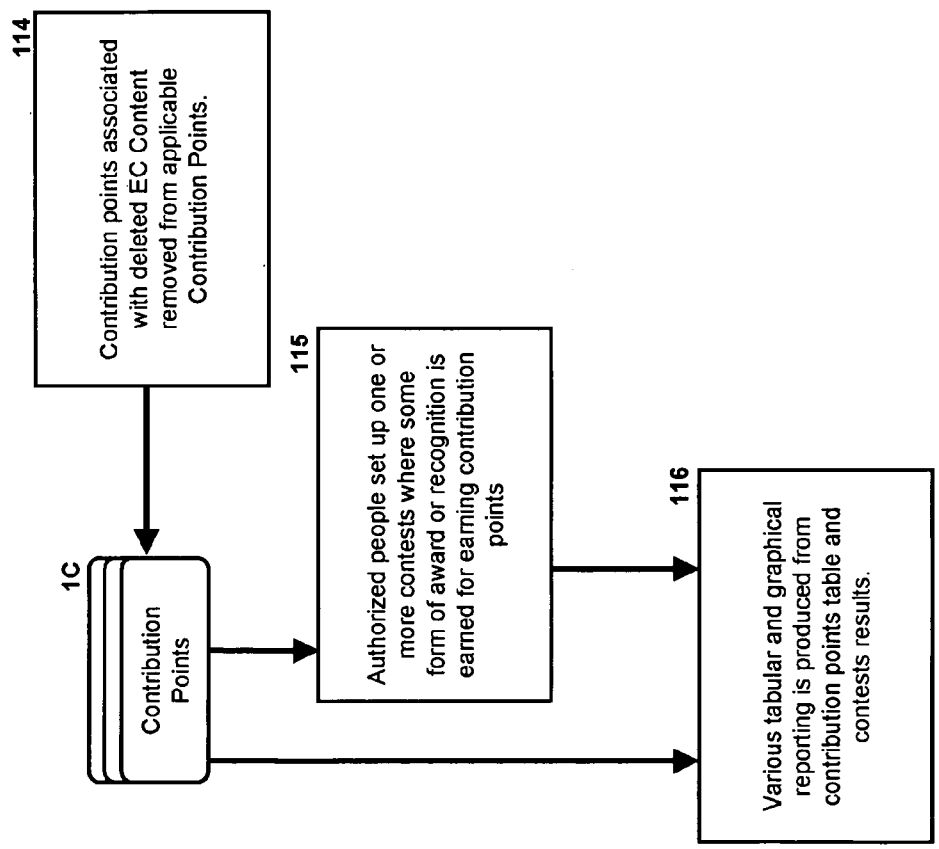
Figure 9:
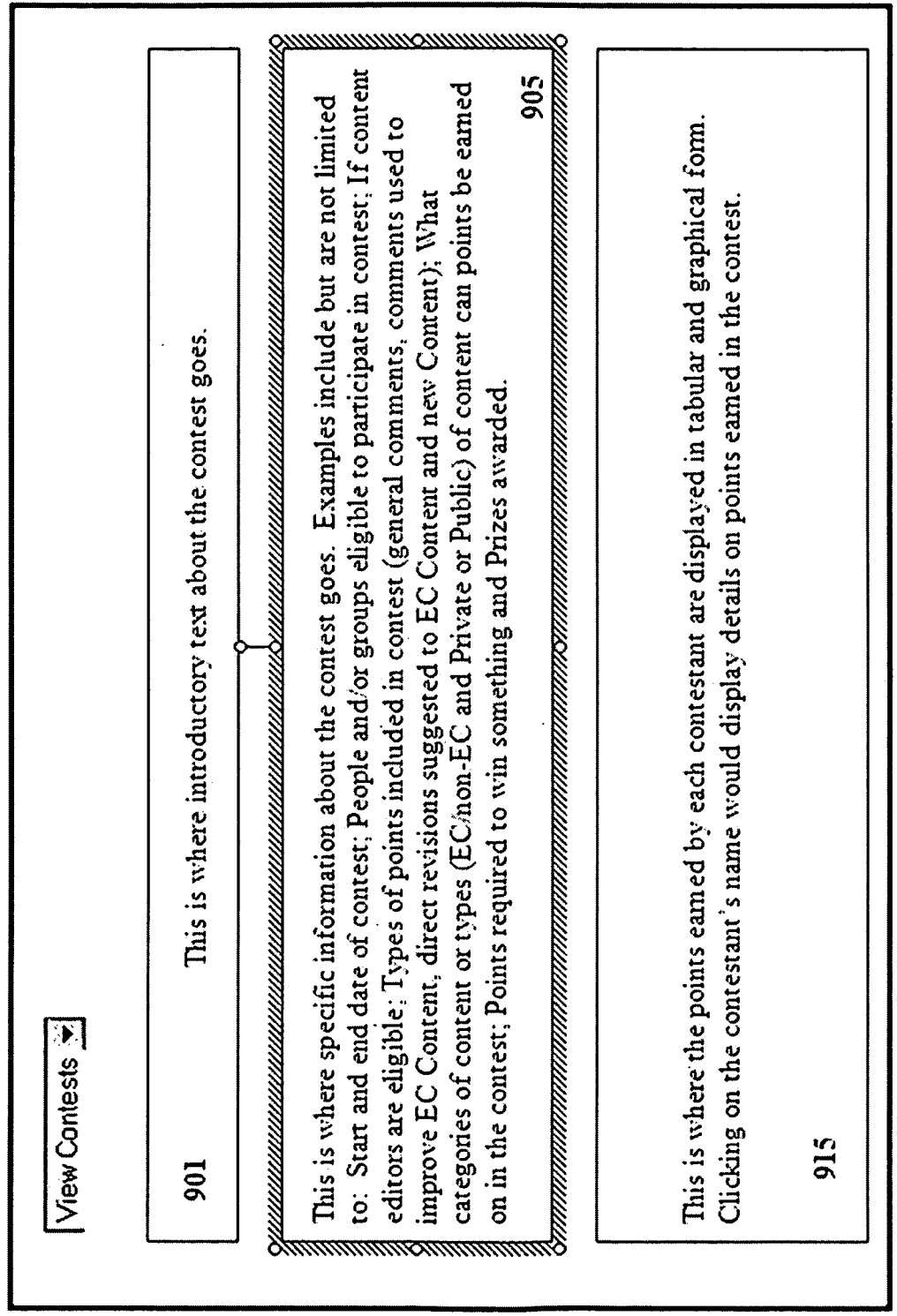
FIG. 9 illustrates an exemplary web page used to display information about contests that have been created to further motivate community members (potentially including editors) to participate in improving content, in accordance with an embodiment of the present invention.

FIGS. 1C is a flowchart illustrating an alternative and exemplary workflow for an exemplary system for providing EC content, in accordance with an embodiment of the present invention. At step 1C, all contribution points are written to a central repository (contribution points table) and include various metadata that allows points to be reported on several different levels including the significant capability to implicitly identify and retain what specific subject matter expertise people have based on what categories of contents they have contributed. In step 114, contribution associated with content that is deleted is removed from the applicable contribution point records. To further incent people to contribute to create EC content, authorized people can set up one or more contests in step 115 to award some sort of financial or other incentives by earning contribution points. Contests can be defined using many different parameters focused on motivating the desired behavior. For example of some possibilities, contests can be set up to run for a particular time frame, only be eligible to select people, include only contributions associated with some types of contributions and for some categories or types of content. FIG. 9 provides an example of a web page used to display contest information and results.

Figure 3:
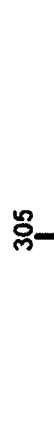
FIG. 3 illustrates an exemplary contribution points web page used to define the contribution points for EC content, in accordance with an embodiment of the present invention.

In step 116 various tabular and graphical reporting is produced using the repository containing all contribution points and the criteria defined for contests. The total contribution points actually recognized and displayed for each individual in Web pages is computed using the computations as defined by the users of the invention. As illustrated in FIGS. 3, the current invention aggregates contribution points for individuals using various weightings, ranges and thresholds.

Figure 1D:
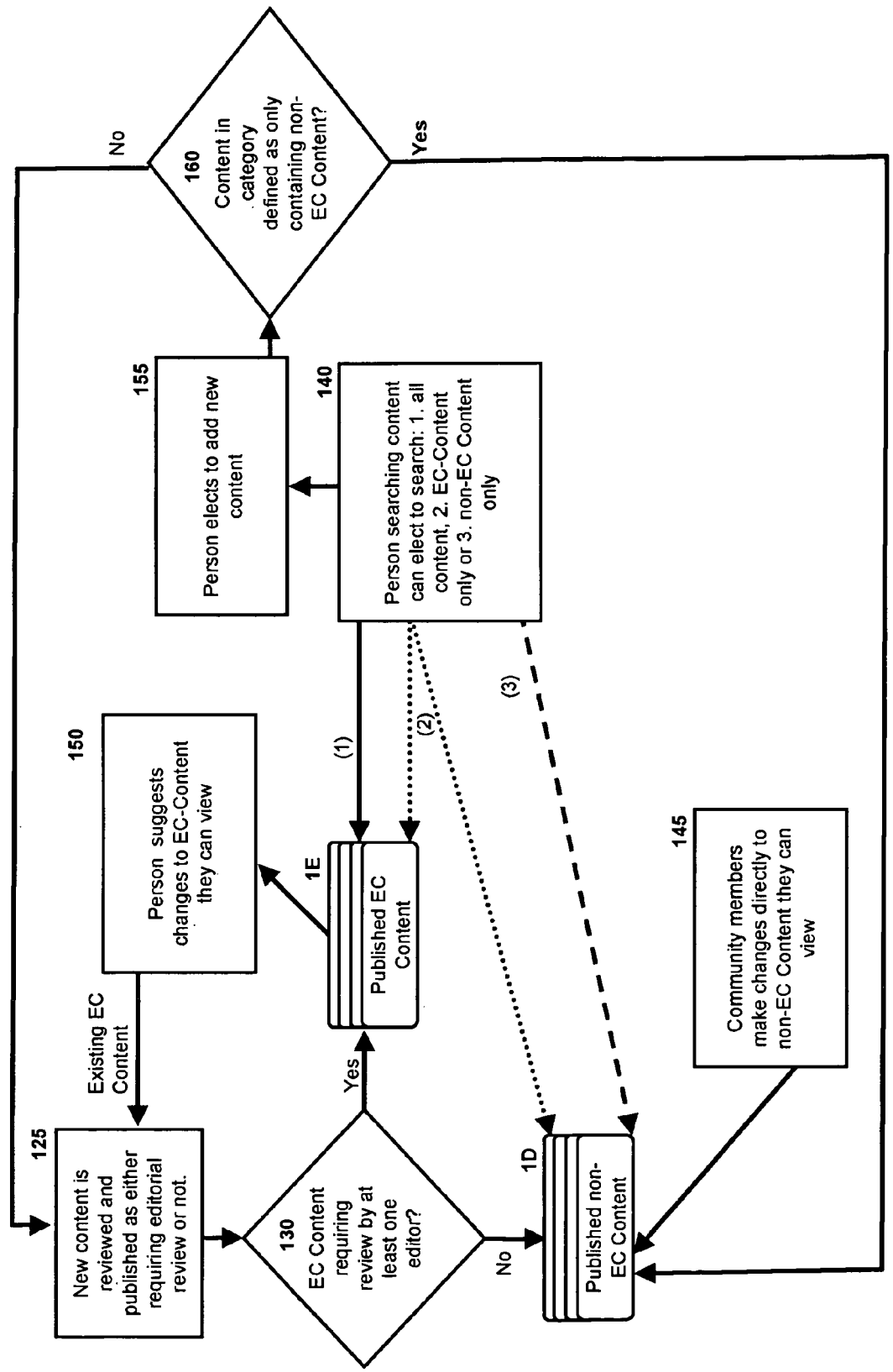
FIG. 1D is an exemplary flowchart illustrating an exemplary workflow for differentiating the treatment of content that must go through one or more editorial reviews and content that does not require any editorial review, in accordance with an embodiment of the present invention.

FIG. 1D is an exemplary flowchart illustrating an exemplary workflow for differentiating the treatment of content that must go through one or more editorial reviews (Editorially Controlled or EC Content) and content that does not require any editorial review (Community Controlled Content, also called non EC Content), in accordance with an embodiment of the present invention. This embodiment allows for editors to define content or categories of content as not requiring editorial control. In step 125 editors define if new content created is being used in such a way and by certain people that one or more levels of editorial review are warranted. If the new content created does require editorial review in step 130, the content is published as EC content and if the content is not deemed to require editorial review it is published as non-EC content. In step 140, people searching the content can elect to search: 1. all content, 2. EC content only or 3. non-EC content only. In step 145, people can directly edit non-EC content they have access to view. People suggesting changes to existing EC content in step 150 submit their desired changed for review in step 125. In step 155 non-editors searching and viewing content that define that new content should be added can either create and publish the content directly or submit it for review, depending on if the content added is in a category where no content requires editorial review or not as defined in step 160.

Those skilled in the art, in light of the present teachings will recognize that the steps presented by way of example in FIG. 1 are for illustrative purposes and may be performed in various different sequences and in some cases steps may be omitted or added.

Alternate embodiments of the invention are contemplated for points awarded for improving EC content include a wide range of suitable and alternative means for determining the value of a contribution and effectively include anything computed manually or systematically that can be counted, summed or otherwise manipulated to allow for relative comparisons.

Preferred embodiments of the present invention define who can edit and view particular content and related community dialogue, facilitate and motivate community contribution towards improving EC content, and implicitly identify and leverage subject mater expertise based on the contribution of community members. In order to define who can edit and view particular content and related community dialogue knowledge base (KB) content can be segmented into similar subject matters using categories. In turn, these categories can be used along with content types such as, but not limited to, public, private, special private, and special public, to selectively provide individuals or groups of individuals with access to view particular categories of content, which in turn restricts who can participate in commenting on and evolving the content. This ability to restrict who can participate in community dialogue for different content types enables users of embodiments of the present invention to selectively bring together community members with similar needs and relevant skills.

Access to the content can be controlled using various means, and exemplary means for controlling access to the content in embodiments of the present invention follow. Content may be viewable by all users, regardless if they have logged in and have been authenticated to be a particular user or if they are anonymous. This type of content is known as public content.

Alternatively, content may be viewable by any person that has successfully logged in using a user id that has been defined as being an internal user. This content is known as private content. Internal users able to view private content are generally staff, however, internal users may include other persons such as, but not limited to, partners or others with particularly close relationships with an organization. People whose system access requirements do not warrant being defined as internal users can instead be defined as external users, which are uniquely known by the system and typically have lesser authorities within the system.

Special public content is viewable by individuals or groups of internal users or external users. As a non-limiting example, an organization may have special public content that is viewable by managers and board members. Special private content can be made viewable by individuals or groups of internal users. As a non-limiting example, an organization may have special private content that is viewable by staff in the IT department only.

Content in the knowledge base can also be defined to require one or more editors to review the content before the content is available for viewing. In addition, the people that are allowed to directly provide draft content for review, or submit specific changes to existing content for review, can be restricted as desired. As a non-limiting example, community members defined as internal users or as external users can be given access to create draft content for review by editors relevant to the category in which the particular content has been placed. Community members can only create draft content for the categories of content they have been given authority to view. Community members may also be defined to be content editors for specific categories of content. Content editors are responsible for reviewing and refining the content as necessary before the content is made viewable by any user. It is contemplated that content may be required to go through multiple editorial reviews, depending on who will be using the content and for what purpose.

The following non-limiting examples have been provided to illustrate how different levels of editorial controls may be used. In all of the examples, the draft content initially created for editorial review may have been given to all staff, individual staff or groups of staff. In one non-limiting example, content that is defined as used by staff to support problem-solving activities may require no editorial control and any staff member may create and publish this content for viewing. Content like this that encourages open-ended dialog to surface opinions and stimulate discussion is generally best served to be community controlled rather than editorially controlled. In another non-limiting example, content that is used by a given department to deal with internal support procedures may require review by a team lead or department manager before being published. In another non-limiting example, content that is used by all staff to understand 401(k) benefits offered by the company may require review first by the benefits manager who makes sure the content is correct and then by the head of Human Resources to ensure that the content is written in a style and format consistent with other HR related issues, and that the content is cross linked to other content that may be relevant to an employee. In yet another non-limiting example, content that is used by customers to understand how to select the appropriate mortgage related product may first require editorial review by the manager of mortgage loan products for accuracy, then by the marketing manager to ensure that the content is in line with the brand, and finally by the compliance officer to ensure that the content is in compliance with relevant truth in lending regulations.

FIG. 2A illustrates an exemplary advanced publishing options web page used to define editorial responsibilities, or publishing rights, for a given user, in accordance with an embodiment of the present invention. A publishing tiers section 201 defines the level of editorial control for the user. For instance, without limitation, if a category has publishers assigned to it with tier-1 and tier-2 editorial authority, the content in that category requires review by the person with tier-1 authority and then the person with tier-2 authority before being viewable by other community members. In the present example, the user has tier-1 editorial authority. Alternate embodiments may have more or fewer tiers of editorial authority, and yet other alternate embodiments may classify the tiers of editorial authority differently for example, without limitation, as levels instead of tiers or as various titles such as, but not limited to, apprentice publisher, master publisher, brand communications publisher, legal review publisher, etc. Content that has been defined as non-EC content would not be controlled by the publishing authorities defined here, but instead would be editable by anyone who had authority to view the content. In the present embodiment, a publishing item status section 203 defines which types of items may be published by the user. In the present embodiment, the user is able to publish public items, special public items, private items, and special private items. A publishing categories section 205 comprises various publishing categories for which the user may be given publishing rights. Once a category has been selected for which the user is given publishing rights, the level of editorial control may be selected from a drop down menu next to the category. In the present example, the user has been given tier-1 publishing rights in a drop down menu 207 for an "About Credit Unions" category 209 and tier-3 publishing rights in a drop down menu 211 for a "Board Material" category 213. As previously described, the publishing rights available for the categories may be classified differently in alternate embodiments.

FIG. 2B illustrates an exemplary web page used to define if a certain person or groups of persons has limited or full access to Special Public and Special Private content, in accordance with an embodiment of the present invention. The checkbox in section 220 is used to define that the user has complete access to all Special Public content and the checkbox in section 222 can be checked to define that the user only has access to a select number of categories containing Special Public content. The checkbox in section 225 is used to define that the user has complete access to all Special Private content and the checkbox in section 227 can be checked to define that the user only has access to a select number of categories containing Special Private. If limited access to view Special Public content is defined for a user, the example web page in FIG. 2C is used to define what specific categories the user can view Special Public content. The checkbox in section 230 would be checked if it was desired to give the user access to view all Special Public content in the "About City Credit Union" category and the checkbox in section 232 for the "About credit unions" sub-category or "child" category. The checkbox in section 235 is not selectable since it is for a Special Private category, which cannot contain Special Public content. If limited access to view Special Private content is defined for a user, the example web page in FIG. 2D is used to define what specific categories the user can view Special Private content. The checkbox in section 242 would be checked if it was desired to give the user access to view all Special Private content in the "About City Credit Union" category and the checkbox in section 244 for the "About credit unions" sub-category or "child" category. The checkbox in section 246 is not selectable since it is for a Special Public category, which cannot contain Special Private content. However, the checkbox for a Special Private category in section 248 is selectable.

To provide further flexibility, administrators using preferred embodiments of the present invention also have the ability to define whether comments may be made on all content or only on private and special private content and to define if the comments can be viewed by all users or internal users only. In addition to enabling content to be EC content as previously described, preferred embodiments of the present invention also enable content to be defined as community-controlled or non-EC content, which enables any person with access to view the content the ability to edit the content. With non-EC content, all changes made to the content are automatically logged and available for review by persons with access to the given content.

Preferred embodiments of the present invention also, facilitate and motivate community contribution towards improving EC content. Community-controlled sites such as, but not limited to, Wikipedia have proven that people around the world are willing to spend time and effort to contribute towards creating and refining content without any financial compensation. The only motivation seems to be the willingness of community members to help others and public acknowledgement for their contributions. Preferred embodiments of the present invention comprise several components that enable users to easily engage in dialogue with others about content and to earn points commensurate with their contributions in improving specific EC content as evaluated by the relevant editors and the other community members using the particular content. Beyond potential recognition of subject matter expertise similar to the recognition afforded by Wikipedia, preferred embodiments of the preset invention provide staff with a mechanism to distinguish themselves in their company, which, when utilized by management, can provide a significantly greater motivator to contribute and revise content.

In preferred embodiments, a contribution point system awards points to community members and content editors based on the perceived degree to which their contribution adds value to the community members using the given content. FIG. 3 illustrates an exemplary contribution points web page used to define parameters for administering the contribution points for EC content, in accordance with an embodiment of the present invention. For each of the activities defined as earning contribution points, the present embodiment allows for the definition of a point range and default points in low range fields 301, high range fields 303 and default fields 305 for each point-earning category. The present embodiment comprises a general comment category 307, a comment resulting in an improvement to KB content category 309, a direct edit to KB content category 311, and a new KB content category 313. The default points in default field 305 corresponding to the appropriate category are awarded if community members or the relevant content editors do not elect to assign contribution points for a given activity. In turn, if community members or relevant content editors wish to assign contribution points, the contribution points awarded must fall within the low and high ranges defined by low range field 301 and high range field 303 for the given activity. These point ranges and defaults can be changed initially and over time to motivate the desired activity. For instance, without limitation, if the content available has become very broad and the desired behavior is to improve existing content rather than add new content, the points awarded for improving existing content could be set to be higher than the points awarded for creating new content. The present embodiment allows for the definition of points across the entire content repository or for specific categories of content.

Referring to FIG. 3, in the present example, contribution points of between 0 and 10 points may be awarded to community members that make general comments about the content that are not used to improve the content about which the comments are made, as shown in low range field 301 and high range filed 303 corresponding to general comment category 307. If an editor or community member does not elect to award contribution points within the range for this activity, 5 points are awarded as dictated by default field 305 corresponding to general comment category 307.

Referring to FIG. 3, in the present example, contribution points of between 10 and 50 points may be awarded to community members that make comments about the content that are used by an editor to improve the content about which the comments are made, as indicated by low range field 301 and high range field 303 corresponding to comment resulting in an improvement to KB content category 309. If an editor or community member does not elect to award contribution points within the range for this activity, 25 points are awarded as indicated by default field 305 corresponding to comment resulting in an improvement to KB content category 309.

The administrators of the present embodiment have options for determining what comments must be reviewed by the lowest-tier editor for the content about which the comments are made to determine if the comments may improve the content. One option is to require the editors to review all comments to determine if the comment may be used to improve the content and to override the default points awarded within the range applicable to the comment. The second option is to automatically have all comments considered to not be relevant to updating the content until a community member rates a comment beyond a threshold defined by the administrator. Once a community member rates the comments higher than the threshold, the relevant editor with the lowest tier publishing rights is notified and may then carry out the steps defined in the first option. Once a particular comment is reviewed by an editor, the comment is marked as such and is not required to be reviewed by an editor again, regardless of any future community ratings of the comment. Like the point ranges and defaults for different activities, the threshold rating required in this feature can also be set to be different for individual categories. This feature enables organizations using the present embodiment to lessen the work required by the editors and instead utilize the community members to identify comments that warrant review.

Referring to FIG. 3, in the present example, contribution points of between 0 and 50 points may be awarded to community members that go beyond commenting on suggested changes and actually provide refined content, as indicated by low rage field 301 and high range field 303 corresponding to direct edit to KB content category 311. If an editor or community member does not elect to award contribution points within the range for this activity, 35 contribution points are awarded as indicated by default field 305 corresponding to direct edit to KB content category 311. In the present example, contribution points of between 20 and 100 points may be awarded to community members that suggest new content for a category to which they have been given access, as indicated by low range field 301 and high range field 303 corresponding to new KB content category 313. If an editor or community member does not elect to award contribution points within the range for this activity, 50 default points are awarded as indicated by default field 305 corresponding to new KB content category 313.

Referring to FIG. 3, in the present embodiment, bonus points may be awarded if the number of times that new content submitted by a community member is viewed exceeds defined thresholds, defined in a bonus contribution points thresholds section 315. For instance, in the present example, if the KB views of new content for a user defined time period exceed 500 views, contribution points equal to 25% of the points awarded on the item are awarded as bonus points. If the content continues to be used and is viewed more than 20,000 times, then a total of 200% of the points awarded, not including previous bonus points awarded, on the item are awarded as bonus points. The number of times the content is viewed is computed using a duration specified by administrators of the present embodiment. Often the time period is defined as 90 days; however, various other time periods may be used for example, without limitation, one day, a week, a year, the life of the content, etc. It is contemplated that by using this method of awarding bonus points, the bonus points will reward community members based on how valuable the content that they submit actually is.

Referring to FIG. 3, a weighting of contribution points section 320 defines how contribution points awarded by editors are weighted in comparison to contribution points awarded by other community members. The total points awarded to a given comment may be a simple average of all of the contribution points submitted for the comment, or the contribution points submitted by the content editors may be weighted more heavily than the contribution points submitted by other community members. In the present embodiment, the contribution points awarded by an editor may have equal weighting to contribution points awarded by any other community member resulting in an average of all of the contribution points submitted, or the points awarded by the editors may be weighted equally with the points of all other community members combined. Alternate embodiments may have various other options for weighting contribution points, for example, without limitation, contribution points submitted by editors may be weighted as a multiple of those submitted by other community members such as, but not limited to, double or ten times, etc. In the present example, the contribution points awarded by an editor are weighted as equal to all other user ratings combined. For example, without limitation, if the editor awards 10 points and the average points awarded by all other community members is 5 points, the actual number of contribution points awarded is 7.5. The present embodiment allows for simplicity of administration; however, alternate embodiments may be used to allow all or select community members to contribute towards defining any or all of the parameters used for awarding points by systematically evaluating community member suggestions for parameter values to arrive at a single set of parameters. This feature enables users of embodiments of the present invention to define the relative importance and perceived ability of editors and other community members to realistically and consistently evaluate a community member's contribution towards improving the content.

Referring to FIG. 3, in addition to defining the default contribution points and ranges applicable across all EC content, the present embodiment enables contribution points to be overridden for any given category with an override button 325. For instance, without limitation, once a category of content exists for a while and is already comprehensive, the administrator of the present embodiment may elect to define contribution points for this category to motivate refinement of existing content rather than creation of new content. Conversely, relatively new categories of content may best be serviced by motivating community members to create new content more so than refining existing content. As part of this invention, contests can also be created to motivate desired behavior.

In addition to defining contribution points for EC content as was previously described, alternative embodiments of the present invention may also enable different contribution points to be defined for community-controlled (non-EC) content and to also override the points at a category level.

In the present invention, to only recognize community member contribution towards content that remains relevant, if content is deemed to no longer be valuable and is deleted, all associated contribution points earned will also be deleted. This is relevant for contribution points earned for either editorially-controlled or community-controlled content. Alternative embodiments may allow points to degrade in value over time and to lose a portion of the points awarded for deleted content rather than losing all points related to deleted content.

In addition to facilitating individuals in a community to participate in improving EC content, preferred embodiments of the present invention facilitate community members to have dialogue with others in the community, leveraging the aggregate wisdom of the community when deriving how the EC content can be improved.

Figure 4:
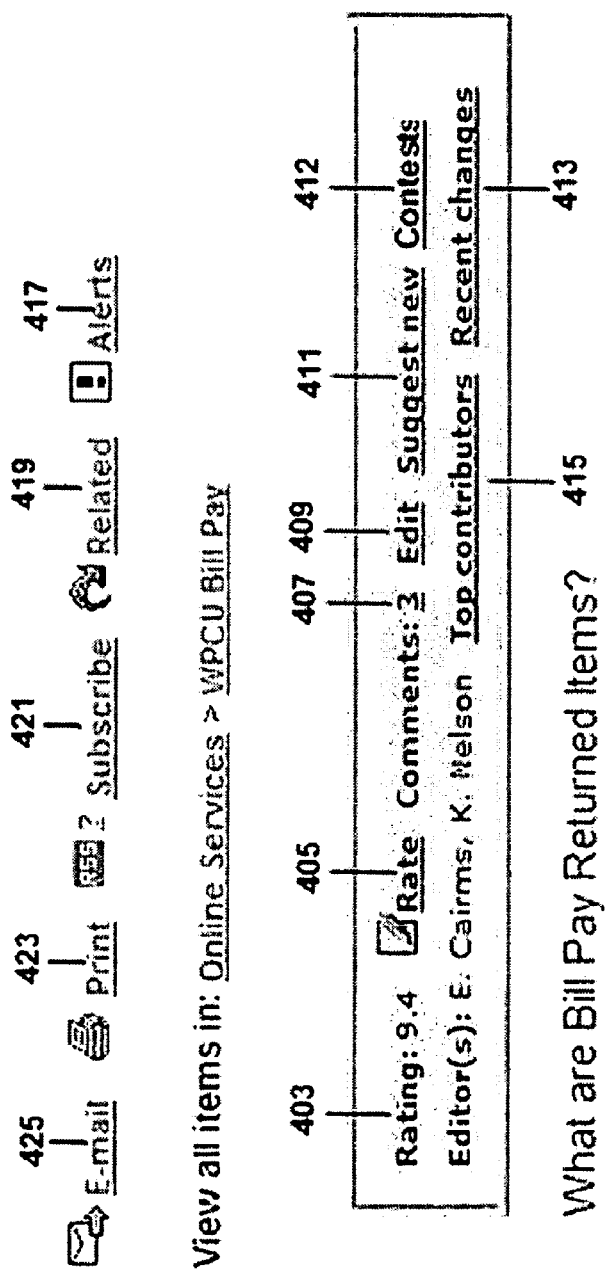
FIG. 4 illustrates an exemplary web page of content, in accordance with an embodiment of the present invention.

FIG. 4 illustrates an exemplary web page of EC or non-EC, in accordance with an embodiment of the present invention. When community members are viewing content to which they have been given access using the present embodiment, these community members have an opportunity to do several things as illustrated in the present example. Community members may view a content item 401. In the present example, content item 401 describes what bill pay returned items are. Community members may also view the overall rating of the content as rated by the community of people viewing the content in a rating display 403. Ratings in the present embodiment range between 0 and 10; however various different scales may be used in alternate embodiments such as, but not limited to, a five star rating system, etc.

Referring to FIG. 4, a rate link 405 enables community members to rate and comment on the content. When a community member clicks on rate link 405, the community member may be presented with a slider, such as, but not limited to, slider 511 shown by way of example in FIG. 5, to select a rating. In alternate embodiments, the community member may select a rating using various different means such as, but not limited to, typing the rating into a text box, selecting the rating from a drop down menu, etc. Once the community member rates the content, the community member is then presented with a text box to provide comments relating to their rating. Directly above the text box for comments text may appear that has been defined by the administrators that varies based on the rating provided by the user. For example, without limitation, the default text may be, "How can the content be improved" for any ratings of 8 or below and "What makes this content especially valuable" for ratings of 9 or 10. This text prompts the community member to provide constructive comments that can be used to improve content and let editors know what the editors are doing right. Alternate embodiments may not include text directed to the community member rating the content.

In the present embodiment, the number of the comments made by other community members about the content is displayed in a comments link 407. If a community member clicks comments link 407, a web page that lists the individual comments and provides several supporting capabilities, such as, but not limited to, the web page shown by way of example in FIG. 5, is displayed. Referring to FIG. 4, a community member may suggest specific changes to the content by clicking on an edit link 409. Edit link 409 enables community members to suggest specific edits to the content by working from a copy of the content. Only those community members that have been given draft access to the content have access to edit link 409. Changes submitted by community members then go through the editorial controls defined for the particular content. Community members may also suggest new content to be added to the category containing this content using a suggest new link 411. This capability is also only accessible by those community members that have been given draft access to the content. If the content in the example was non-EC content, the person would be able to edit and create content without requiring editorial review by others. If a community member clicks contests link 412, a web page that lists contests for earning contribution points, such as, but not limited to, the web page shown by way of example in FIG. 9, is displayed. Recent changes link 413 enable community members to view a log of changes made to the content. Using this log, community members can quickly understand how and why the content has evolved over time. Top contributors link 415 enables community members to view an online report listing the names of the members in the community that have earned the most points for contributions within the category associated with the content and comments. This report is discussed in further detail in reference to FIG. 8 and enables subject mater experts to be implicitly defined for particular subject matter domains, or categories, based on the demonstrated knowledge of these community members.

Referring to FIG. 4, an alert link 417 enables a community member to be proactively notified via email when new activity occurs on content about which the community member has interest. A similar feature may be accessible from the web page displaying the comments, such as, but not limited to, the web page illustrated by way of example in FIG. 5. Clicking on alert link 417 enables the community member to be notified via email when changes are made to the content or new comments are made for this content. Community members can also request to be notified via email if any activity relating to content or related comments occurs with other content contained in the same category. Clicking on a related link 419 enables the community member to view content that the editor had deemed to be related to the content being viewed. Using preferred embodiments of the present invention, content can be placed in one or more categories, and content across multiple categories can be related to each other using tags. Tags are known to those skilled in the art as words or other unique groupings of characters that enable content to be grouped together.

Referring to FIG. 4, subscribe link 421 enables a community member to be proactively notified via RSS feeds when new activity occurs on content about which the community member has an interest. This feature may also be accessible from a web page displaying comments, for example, without limitation the web page illustrated by way of example in FIG. 5. Clicking on subscribe link 421 enables the user to be notified via RSS feeds when new changes are made to the content or new comments are made for this content. Community members may also request to be notified via RSS feeds if any activity relating to content or related comments occurs with other content contained in the same category. Referring to FIG. 4, a community member may print the content in a format that is conducive to printing by clicking a print link 423. An email link 425 enables a community member to email a link to the content and related comments to others. It is contemplated that this function will facilitate in bringing new people into the community.

In addition to using proprietary technology to send email notifications to community members regarding content changes, the present embodiment also uses a commonly used Web technology called Really Simple Syndication (RSS) as previously described. RSS is a family of Web feed formats used to publish frequently updated content such as, but not limited to, blog entries, news headlines or podcasts. An RSS document, which is typically called a feed, web feed, or channel, comprises either a summary of content from an associated web site or the full text of the website. RSS makes it possible for people to keep up with their favorite web sites in an automated manner that can be piped into special programs or filtered displays. RSS content can be read using software called an RSS reader, a feed reader or an aggregator. The user subscribes to a feed by entering the feed's link into the reader or by clicking an RSS icon in a browser that initiates the subscription process. The reader checks the subscribed feeds of the user regularly for new content, downloading any updates that the reader finds. In some embodiments notifications may be sent to community members using various other means including, but not limited to, text messages to a wireless device, instant messaging, SMS messaging, Tweets from Twitter or similar services, etc.

FIG. 5 illustrates an exemplary web page displaying comments made by community members about a particular item of content, in accordance with an embodiment of the present invention. Clicking on the notify when new activity link 501 enables community members to request to be notified via RSS feed, email, or otherwise when new comments are made for this content. The community members can also request to be notified if any new comments are made related to comments for other content contained in the same category as this content. This feature enables community members to opt to be proactively pulled back into the conversation towards improving the content whenever there is new activity regarding content about which they are interested. A similar feature is also accessible from a web page displaying the content, for example, without limitation, the web page illustrated by way of example in FIG. 4.

Referring to FIG. 5, an editors link 503 displays a web page containing the contribution points and user profile information for the editors providing the first level review for this content. The names displayed for these editors, as well as the names displayed for community members, can be set to display nicknames as desired to protect anonymity when being displayed to internal and/or external users. Enabling editors to earn contribution points helps provide motivation for the editors to actively manage their content and also enables their contributions and subject matter expertise to be carried with them later whether they are an editor for this content or not.

To enable easy review of comments in the order that the comments were visible by community members, by default comments are listed in descending order of when the comments were approved if approval is required for the user making the comment. Comments can also be sorted using other sort orders such as, but not limited to, sorting by contribution points earned for the comment or by the community member making the comments. A sort menu 505 enables community members to change between various sort orders. This ability to sort the comments enables community members to quickly identify and review comments. A comment only link 507 enables a community member to make a comment about the content without being required to rate the content. A rate link 509 provides the same capability as rate link 405 shown by way of example in FIG. 4. When a community member clicks on rate link 509, the community member is presented with means for providing a rating such as, but not limited to, a slider similar a slider 511, a text box in which to enter a rating, etc. Once the community member rates the content, the community member may then be presented with a text box to provide comments relating to their rating.

Referring to FIG. 5, a comment section 513 illustrates where a community member nicknamed "Judy the kid" made a comment. Comment section 513 comprises a comment 515, an editor response 517, a contribution points display 519, a comment rating display 521, and comment date and time information 523. In the present example, contribution points display 519 indicates that "Judy the kid" has earned 500 total contribution points. Clicking on a nickname link 525 or on contribution points display 519 takes a community member to a web page that provides a detailed breakdown of how and in what categories Judy the kid has earned her points, similar to the web page shown by way of example in FIG. 7. Contribution points earned by people in the community help define how credible the community member is as a whole and within given subject matters or categories. Comment rating display 521 indicates that Judy the kid has rated the content at 6.0, and comment date and time information 523 indicates that the comments were made on 10/1/2007 at 6:50 AM and approved on 10/1/2007 at 7:50 AM. Editor response 517 indicates that one of the content editors, E. Cairns, used comment 515 to improve the content. In some embodiments, comments that are used by editors to improve content may be highlighted using a unique color defined by the administrators. E. Cairns also made a comment directly in comment section 513 as editor response 517. The point range and default, 32 points in this example, are displayed by slider 511 reflect the point range defined for an activity associated with comments used to improve the content. The viewing community member may use slider 511 to assign contribution points to Judy the kid. Points awarded in 516 shows the total number of contribution points that Judy the kid has earned for comment 515 after taking into account total points awarded by each individual and how the editor's points awarded have been defined to be weighted against points awarded by the other community members in the system options as illustrated in the sample web page provided in FIG. 3.

Please note that comments appear to the community as soon as the comments are approved, which can be done automatically for some community members or may require review for other community members. The range of points available for comments initially approved is the same as the range defined for general comments. If an editor determines later that the comment can be used to improve the content, the range of points available for being awarded to the comment increases to the range defined for comments used to improve the EC content and any ratings previously done for the comment using the range for general comments are deleted.

Referring to FIG. 5, since the community member viewing this Web page illustrated has not yet rated this comment and is not the community member that made the comment, the community member viewing the Web page can use slider 511 to define how valuable they think the comment is in improving the content. The impact of an individual's rating of a comment on the total contribution points awarded to the comment is dependent on the total number of other community members that have rated the comment and the weighting specified in the system options for how the editor's rating should be weighted in the calculation.

Referring to FIG. 5, a comment section 529 displays a comment made by another community member nicknamed "Mississippi." Mississippi has earned 130 contribution points, displayed in a contribution points display 531, and Mississippi has given this content a rating of 9, displayed in a rating display 533. Since the viewing community member has already rated this comment a 4 in a points you awarded display 535, a slider for rating the comment is not present, and the community member is unable to rate the comment again. However, in alternate embodiments, a community member may be able to change their rating of a particular comment if they have already rated the comment. A points awarded display 537 shows the total computed contribution points that Mississippi has earned for this comment, which is 5 points since this comment is basic for even a general comment and was not used by an editor to improve the content.

In comment section 527, a comment made by E. Cairns, one of the editors, is displayed. Since E. Cairns is an editor with the lowest tier publishing rights for this content, he can only make comments and he cannot rate the content itself. In this example, E. Cairns is polling community members to get their opinion on expanding the content to include more information about other types of items that can be returned. It is contemplated that email alerts, RSS feeds and the capability of the present embodiment to enable community members to search for newly created comments will facilitate the gaining of access to this content by community members to help E. Cairns improve the content.

An object of preferred embodiments of the present invention is to motivate community members, including editors, to participate in improving EC content and to implicitly identify subject matter expertise based on demonstrated knowledge. As such, contribution points awarded are controlled to be commensurate with the value of the contribution in improving the EC content, and community members can only view content and earn contribution points for content to which they have been given access. This section speaks to the facilities of a preferred embodiment that support contribution point awards and how contribution points are used to motivate community participation.

As previously defined, contribution points are awarded by editors and other community members based on the type of activity and the degree to which that activity directly improves the content. As previously discussed, contribution points can be awarded as the default points awarded for general comments. Community members, including editors, can in turn override these default points from a comments page, for example, without limitation, the comments page illustrated by way of example in FIG. 5, to rate the comments within the predefined ranges associated with the comment type. Bonus points for approved new content can also earn points based on the points already awarded for the content and the number of times the content has been viewed in excess of predefined thresholds. Other facilities to award points enable first level editors to award points using administrative pages closely coupled with the pages that editors use to edit and publish the content. The following description details these facilities available to editors. As discussed throughout this document, alternate embodiments may include various other means for awarding points to community members.

FIG. 6 illustrates an exemplary web page where approved comments that require review are processed by editors, in accordance with an embodiment of the present invention. In the present embodiment, this web page is used by the editors to process comments made on content with which they have first level editorial rights. In the present embodiment, the lowest level editors are the editors responsible for the content, and higher-level editors generally serve as a review process. All comments that appear in this page have already been manually or systematically approved; however, these comments have not been reviewed by the appropriate editor to determine if the comments should be used to improve the content and if the default points awarded should be overridden. As mentioned earlier, preferred embodiments of the present invention can be set up to only require editors to review comments where the community has indicated that the comments are very good and should be considered for inclusion in the content. Editors are automatically notified each day if they have any comments that require their review. Following is a breakdown of what is included in this report, which is illustrated by way of example in FIG. 6.

Instead of viewing all comments that require action, the editor can view all comments for a specific piece of content, denoted by a unique knowledge base identification number (KBID) by entering a KBID in a KBID text box 601 and clicking a get comments button 603. When the comments are returned, the information pertaining to the comments is organized in columns. A KBID column 605 lists the KBID for the content on which the comment was made. Clicking on a KBID in KBID column 605 brings the editor to a page used to edit this content. A date submitted column 607 lists the date and time that the comments were submitted. In alternate embodiments the time submitted may be listed in a separate column or may not be listed at all. In the present embodiment, a submitted by column 609 lists the names of the community members who submitted the comments and whether these community members are internal or external. In alternate embodiments submitted by column may not indicate if the community member is internal or external. Clicking on the name of a community member in the present embodiment brings up a page comprising the total points earned by this community member, such as, but not limited to, as the page shown by way of example in FIG. 7. An approved by column 611 lists the names of the community members who approved the comments and the dates when the comments were approved. In the present embodiment, no name appears in approved by column 611 if a comment is automatically approved by the system. In alternate embodiments an indication that the comment was automatically approved by the system may be shown in approved by column 611 such as, but not limited to, "automatically approved" or "system approved". Administrators of the system can define the person or people who are authorized to initially approve comments. This review generally ensures that inappropriate language in a comment is not published if it has gotten through automated system edit checks.

A comment column 613 comprises a comment text 615 and a slider 617 that enables the editor to award contribution points different from the default points available. If the content is identified as being used to change the content, slider 617 displays the point range and default associated with comments used to update the content rather than the point range and default for a general comment. Comment column 613 also comprises a publisher notes link 619, which is displayed with all the comments within the comment used to improve the content as exemplified in item 517 of FIG. 5. A rating column 621 reflects the contribution points awarded by the editor for the comment. If slider 617 is viewable, indicating that an editor has not yet awarded points for the comment and the points indicated in rating column 621 reflect the default amount of points, the editor can use slider 617 to award points different from the default number of points.

Referring to FIG. 6, the page shown not only enables editors to view information about various comments, the page also enables editors to perform actions on the comments. Checking a checkbox in an exclude form external users column 623 enables the editor to define that a given comment is not visible to external users. An action column 625 enables the editor to define how to address each comment. If an inappropriate comment somehow gets through the approval process, the editor may elect to reject the comment here. Another option is to define that a comment will not be used to improve the content. The final option is to define that one or more comments relating to a particular piece of content will be used to improve the content. After selecting these comments and clicking a Submit Comments button 627, the editor is brought to a Web page that enables the editor to edit content with the content pre-loaded and the comments selected for usage in improving the content displayed. Once the content is updated and either published or submitted to a higher-level editor, the comment is marked as being used for improving the content, the applicable range of points is updated and the comment is removed from this page.

In preferred embodiments contribution points may also be awarded when revised and new content is submitted for editorial review and approval. In these cases, the page used to create and publish the content displays a slider reflecting the applicable point range and default points available that the first level editor can use to award points different from the default amount of points. If the content is created or refined by an editor, only a higher-level editor can award points different from the default number of points.

In addition to awarding contribution points, preferred embodiments of the present invention do several things to provide community members with exposure and recognition for contributions and areas of expertise. For example, without limitation, a comments web page, such as, but not limited to, the web page shown by way of example in FIG. 5, displays the total points earned by each community member making comments, and clicking on the total points for a community member displays an online web report, such as, but not limited to, the web report shown by way of example in FIG. 7, that displays each specific activity earning contribution points for the community member. This report provides detailed visibility for how individual community members are doing in earning points and how they compare to other community members.

Figure 7:
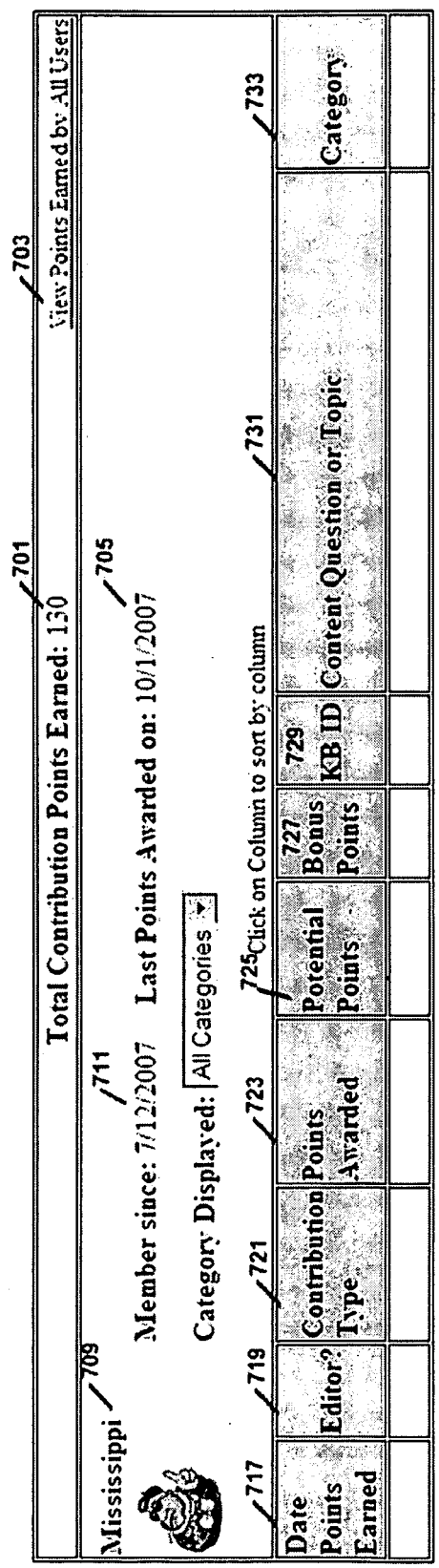
FIG. 7 illustrates an exemplary web page displaying contribution points earned by a given user, in accordance with an embodiment of the present invention.

FIG. 7 illustrates an exemplary web page displaying contribution points earned by a given user, in accordance with an embodiment of the present invention. The total contribution points earned by the community member are prominently displayed on top of the page in a points display 701. An online report listing all community members who have earned contribution points is readily accessible by clicking a view points earned by all users link 703, which enables community members to quickly compare this community member's total points relative to other community members for all categories and for specific categories or subject matters. The last date on which the community member earned contribution points displayed in a last points date display 705 to indicate if the community member has contributed recently.

By default, the detailed records of the community member's contribution points include all contribution points earned for all subject matters or categories. However, a category displayed menu 707 enables the detailed records for specific categories to be displayed. When the contribution points earned are associated with content in multiple categories, the activity and points are only associated with what has been defined as the content's primary category. In cases where a particular category is selected when reporting contribution point activity, the activity associated with categories that have not been defined as a primary category are included in the reporting. Therefore, although points earned for content in multiple categories enables community members to be recognized for their subject matter expertise, the same points are not counted multiple times. Information about the community member is also displayed on the page such as, but not limited to, a screen name 709, a date 711 indicating when the member joined the community, a picture 713, and alternate embodiments may display various other types of information such as, but not limited to, home town, occupation, age, real name, etc.

Referring to FIG. 7, clicking on any column of the report causes the report detail to be sorted alternately in ascending/descending order by the column values, and a comment 715 indicates this to the community member. A date column 717 comprises the date when the points were first earned. The actual points awarded may change over time with new ratings from community members; however this date will not. An editor column 719 identifies if the community member was a first level editor for the activity earning the contribution at the time the points were earned. A contribution type column 721 comprises an icon or description that identifies the activity type, which could be general content, content used to improve content, suggested revisions provided for content, or new content. A points awarded column 723 indicates how many contribution points have been awarded for this activity, which, as previously mentioned, may change over time with new community activity. A potential points column 725 indicates the range of points available for this activity at the time the points were earned. A bonus points column 727 indicates how many bonus points were earned if the activity was for suggesting new content that was approved by an editor. A KBID column 729 comprises the KBID for the content related to the activity earning the contribution points. In the present embodiment, clicking on the KBID opens a new page containing the content and related comments. A comment column 731 comprises the comment made or the title of the content refined or created, depending on the type of activity for which the community member earned the points. A category column 733 comprises the content for which the community member earned contribution points.

FIG. 8 illustrates an exemplary web page of top contributors, in accordance with an embodiment of the present invention. In the present embodiment, the top contributors web report is accessible by all community members from every page of content. By default the report lists the top contributors for the primary subject matter relating to the content; however the report includes the capability to display top contributors across any or all categories and within specified timeframes. If this report is called from a piece of content, the community members listed and associated points earned are associated with the primary category associated with the contributions. If not, all categories are shown. However, a community member may select to display a specific category by choosing this category from a category displayed menu 801. In the present embodiment, category displayed menu 801 is a dropdown menu that can also be used to specify any other category of information, which lists points earned by community members for content in the category selected here. A time period menu 803 is a dropdown menu that enables community members to specify a period of time over which the points displayed were earned. The default for time period menu 803 may be set by the administrator of the system and may include time periods such as, but not limited to, the last 7 days, last 30 days, last 90 days, last 365 days, and forever. In some embodiments, community members may also specify specific date ranges using other means such as, but not limited to, text boxes, etc. A group menu 805 is a dropdown menu that enables community members to selectively display one or more groups of community members in the body of the web page. In preferred embodiments, all of the dropdown menus can be used in conjunction to provide the desired filtering. In addition, all of the column headings in this report may be clicked to cause the report to be sorted alternately in ascending and descending order using the values in the column. The default sort for the report in the present embodiment, sorts the community members by total points awarded per member from highest to lowest points.

Referring to FIG. 8, a total points earned column 807 indicates the total points earned by the community member (as computed using the system options) for the category selected or for all categories if a category is not selected. A contributor column 809 indicates the name or nickname of the community member earning the points. If allowed by the community member, clicking on this field allows this community member to be contacted via email or another messaging system, for example, without limitation, a messaging system that is part of a customer care software suite in which this system is included. A type of user column 811 identifies if the community member is internal or external to the organization and may indicate if the community member is an editor. A points for new content column 813 indicates the total number of points earned for creating new content, including, but not limited to, any bonus points earned. A points for content revision column 815 indicates the total number of points earned for revising EC content. A points for comments used to improve content column 817 indicates the total number of points earned for making comments that were used by an editor for improving the EC content. Finally, a points for general comments column 819 indicates the total number of points earned for making general comments that were not used by an editor for improving the EC content.

Since a detailed record is captured for every individual activity earning a contribution points for a community member, preferred embodiments of the present invention can easily produce graphical and tabular reports at any level of aggregation. In turn, these reports are made visible in various reports and dashboards prominently exposed to management staff and all of the community. In addition, the detailed contribution point metrics captured lend themselves for inclusion in various compensation or other incentive plans used to motivate staff or other community members external to the organization. To facilitate users of the preferred embodiment of the present invention to further motivate people using and maintaining the content to consistently provide quality contributions towards improving desired content, the invention includes web pages for administering and viewing results for contests focused on motivating and rewarding participation. As an example, without limitation, contents can be created for all or select users of the content and for contributions for all or select categories of content. The particulars of established contests will be accessible from several web pages used to report on contribution points earned and listing of top contribution.

FIG. 9 illustrates an example of the types of information captured and reported on for established contests, in accordance with an embodiment of the present invention. Item 901 is a dropdown menu that includes a list of all active contests, which when one contest is selected causes all content in the page to be displayed for the contest selected. Item 905 is where the contest sponsors include any language that speaks to the contest and motivates participation. Item 910 is where specific information about the contest goes. Examples include but are not limited to: Start and end date of contest; People and/or groups eligible to participate in contest; If content editors are eligible; Types of points included in contest (general comments, comments used to improve EC Content, direct revisions suggested to EC Content and new Content); What categories of content or types (EC/non-EC and Private or Public) of content can points be earned on in the contest; Points required to win something and Prizes awarded. Item 915 is where the points earned by each contestant are displayed in tabular and graphical form. Clicking on the contestant's name would display details on points earned in the contest.

Preferred embodiments of the present invention enable community members to implicitly identify and leverage subject mater expertise internal and external to an organization owning the content based on their contribution to add to and evolve said content. Since contributions by community members using and editing the content are associated with categories and tags, preferred embodiments can identify the various subject matter expertise of individuals based on what type of content for which they earned their contribution points. In embodiments of the present invention, reports can be generated for limited distribution within the organization indicating the expertise of contributing members. In addition, this demonstrated expertise carries with the individual over time regardless of any change in their responsibilities, which enables retention of subject matter expertise wherever it may be internal or external to an organization.

In a non-limiting example, when an editor or other community member creates new content or refines existing content, the page used to perform these actions comprises a button to "Invite Suggestions." When clicked, the community member can solicit help, via email, using an internal messaging facility, or otherwise from other community members that have been explicitly defined as subject matter experts for the type of content that the community member is creating or refining. In addition, community members that have been implicitly defined as relevant subject matter experts based on their contribution are also listed and available for help requests. In addition, a top contributors online report, such as, but not limited to, the top contributors report shown by way of example in FIG. 8 is readily accessible to all community members for identifying members with specific subject matter expertise and contacting these members as allowed for by each community member.

A preferred embodiment of the present invention comprises the following components and abilities. The present embodiment comprises a Web-based system that allows a single repository of digitally stored content to be selectively extended to different people and groups of people. This system has the ability to selectively define one or more levels of editorial control within sections of the content repository before the content is available for viewing by people in the community who are provided access to the content. This system also has the ability to selectively enable community members to make comments about the content to which they have access and to view the comments made by other community members about said content. Administrators of the system have the ability to selectively define contribution point ranges and defaults, which may be set to vary for different categories of content, which are awarded to editors and other community members for undertaking activities to improve the content, the ranges being commensurate with the potential value of the associated activity.

In alternate embodiments, these point ranges and defaults may be programmed into the system. In the present embodiment, content editors and other community members are able to award contribution points, within the pre-defined ranges for the particular activity, to people who make general comments about the content that is not used by editors to improve the content, to people who make comments about the content that is used by editors to improve the content, to other community members for submitting specific content revision suggestions, and for new content suggested by other community members. System administrators may define thresholds for how many times new content suggested must be viewed in order to earn the person suggesting the content additional bonus contribution points for suggesting highly-used content, or these thresholds may be programmed into the system. In the present embodiment, content editors of a higher level may award contribution points, within the pre-defined range for the particular activity, to lower level content editors of said content for specific content revision suggestions and for new content suggested and approved. Administrators of the system have the ability to define how points awarded by editors are weighted against points awarded by other community members when computing the actual points awarded for the person's contribution. In the present embodiment, the system has the ability to associate points awarded with the subject matter of the contribution earning the points and to use these points as a method of implicitly identifying subject matter experts based on the knowledge they have demonstrated when improving the EC content.

Alternate embodiments are contemplated that implement a wide range of suitable and alternative means for determining the value of a contribution. Alternate embodiments of the invention for determining and awarding points for improving EC content include, without limitation, a wide range of suitable and alternative means for determining the value of a contribution and effectively include anything computed manually or systematically that can be counted, summed or otherwise manipulated to allow for relative comparisons. By way of example, without limitation, some alternative methods of the present invention include but are not limited to the following individually and in various combinations thereof and using various calculations or formulations:

Instead of using "points" to recognize contribution by people to improve content, using anything that could be mathematically manipulated such as awarding a certain number of stars or other elements, adding thumbs up, subtracting thumbs down, awarding gold units for contributions perceived as more valuable than silver units, etc.

Contributions awarded simply based on the number of times a person provides any assessment of the contribution.

Using different ranges or no ranges at all to restrict the amount of recognition that can be realized for different contributions.

Contributions assessed systematically based on the number of times or length of time a comment or new or revised content was viewed, possibly differentiating based on characteristics of the person viewing the content.

Comments assessed systematically based on the extent to which the comments were used to refine the related content. This could be done in a simple fashion by merely comparing words between the content and comments or by using more sophisticated techniques using fuzzy logic to assess the intent of the content contribution and the extent to which it is reflected in the related content.

Contributions assessed systematically based on the number of times and perceived reputation of external sources linking to the content contributed.

Contributions assessed manually by any member of the community of users viewing the content (comments, revisions and new content) with different weightings placed on each assessment based on how the individual assessing the contribution is viewed in the community based on their contributions or other assessment of their relative status in the community.

Awards of gift cards or other incentives for each contribution, certain contributions or when certain contribution levels or achieved.

Bonus points awarded for contributions based on how often the content/comment was viewed, rated or any combination there of.

Bonus points awarded for certain contributions or certain aggregate levels of contribution being met by an individual or team of individuals.

Figure 10:
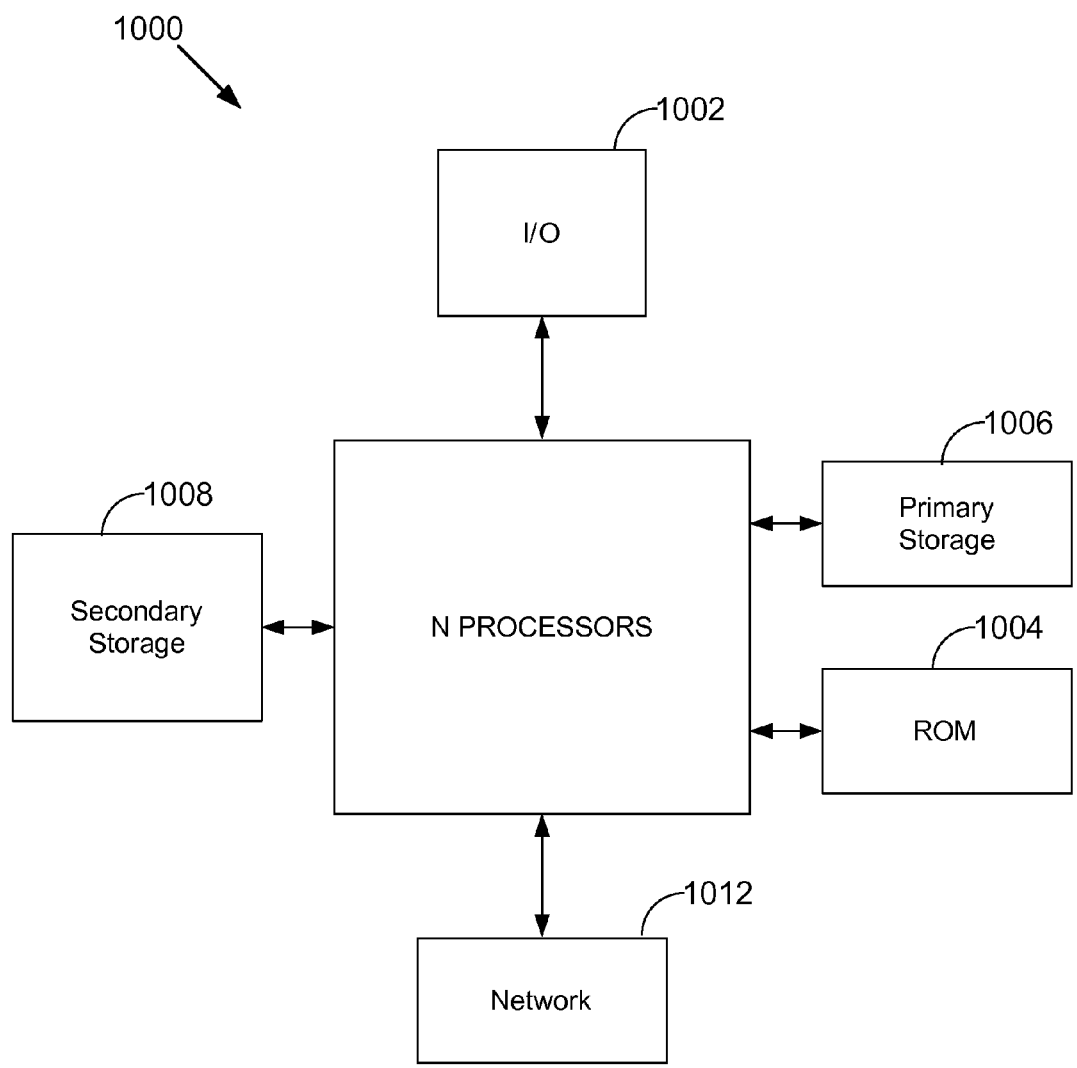
FIG. 10 illustrates a typical computer system that, when appropriately configured or designed, can serve as a computer system in which the invention may be embodied.

FIG. 10 illustrates a typical computer system that, when appropriately configured or designed, can serve as a computer system in which the invention may be embodied. The computer system 1000 includes any number of processors 1002 (also referred to as central processing units, or CPUs) that are coupled to storage devices including primary storage 1006 (typically a random access memory, or RAM), primary storage 1004 (typically a read only memory, or ROM). CPU 1002 may be of various types including microcontrollers (e.g., with embedded RAM/ROM) and microprocessors such as programmable devices (e.g., RISC or SISC based, or CPLDs and FPGAs) and un-programmable devices such as gate array ASICs or general purpose microprocessors. As is well known in the art, primary storage 1004 acts to transfer data and instructions uni-directionally to the CPU and primary storage 1006 is used typically to transfer data and instructions in a bi-directional manner. Both of these primary storage devices may include any suitable computer-readable media such as those described above. A mass storage device 1008 may also be coupled bi-directionally to CPU 1002 and provides additional data storage capacity and may include any of the computer-readable media described above. Mass storage device 1008 may be used to store programs, data and the like and is typically a secondary storage medium such as a hard disk. It will be appreciated that the information retained within the mass storage device 1008, may, in appropriate cases, be incorporated in standard fashion as part of primary storage 1006 as virtual memory. A specific mass storage device such as a CD-ROM 914 may also pass data uni-directionally to the CPU.

CPU 1002 may also be coupled to an interface 910 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1002 optionally may be coupled to an external device such as a database or a computer or telecommunications or internet network using an external connection as shown generally at 912, which may be implemented as a hardwired or wireless communications link using suitable conventional technologies. With such a connection, it is contemplated that the CPU might receive information from the network, or might output information to the network in the course of performing the method steps described in the teachings of the present invention.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing novel means for and/or steps described that the applications designer will selectively decide, depending upon the practical considerations of the particular implementation, to carry out and/or locate within the jurisdiction of the USA. For any claims construction of the following claims that are construed under 35 USC §112 (6) it is intended that the corresponding means for and/or steps for carrying out the claimed function also include those embodiments, and equivalents, as contemplated above that implement at least some novel aspects and objects of the present invention in the jurisdiction of the USA. For example, the processes of editing and viewing the content, awarding contribution points, and administering the system may be performed and/or located outside of the jurisdiction of the USA while the remaining method steps and/or system components of the forgoing embodiments are typically required to be located/performed in the US for practical considerations.

Having fully described at least one embodiment of the present invention, other equivalent or alternative methods of providing a method and system for facilitating and motivating members of a community to participate in directly improving and creating editorially-controlled content according to the present invention will be apparent to those skilled in the art. The invention has been described above by way of illustration, and the specific embodiments disclosed are not intended to limit the invention to the particular forms disclosed. For example, the particular implementation of the system may vary depending upon the particular type of network used. The systems described in the foregoing were directed to web-based implementations; however, similar techniques are to provide systems that may function on networks other than the Internet such as, but not limited to, a private network in a corporation or university. Non web-based implementations of the present invention are contemplated as within the scope of the present invention. The invention is thus to cover all modifications, equivalents, and alternatives falling within the spirit and scope of the following claims.

What is claimed is:

1. A computer implemented method for information editorial controls, wherein a program stored on a non-transitory computer-readable storage medium instructs a processor to perform the method comprising the steps of:

at least one member in an online community receiving authorization to view at least one category of editorially-controlled content, view published comments on said at least one category from a member of said group, add additional comments to said at least one category, add further comments to said published comments and rate said published comments;

a first editor of said group in said online community receiving authorization to publish said at least one category of editorially-controlled content, review said additional and further comments, incorporate said additional and further comments into said at least one category of editorially-controlled content and assign points within a predefined range for ratings of said comments exceeding a predetermined level to a member contributing additional comments and a member contributing further comments, in which said assigned points identify subject matter expertise for said member contributing additional comments and said member contributing further comments in said category;

a member of said group rating said published comments within a first predefined range;

a contributing member of said group submitting said additional comments;

said first editor reviewing said additional comments to determine suitability for incorporation of said additional comments into said at least one category of editorially-controlled content and determining whether to award points to said contributing member within a second predefined range;

said first editor incorporating suitable additional comments into said at least one category of editorially-controlled content and publishing an edited category of editorially-controlled content wherein said suitable additional comments improves the content of said at least one category; and at least one member of said group receiving contribution points based at least in part on their awarded points and rating of their published comments.

2. The method as recited in claim 1, further comprising the step of reviewing a contributing member's editorially controlled content revision and determining the amount of points to award said contributing member within a seventh predefined range, said determining being based at least in part on said at least one category associated with the revision.

3. The method as recited in claim 1, further comprising the step of reviewing a contributing member's new contribution of editorially controlled content and determining the amount of points to award said contributing member within a eighth predefined range, said determining being based at least in part on said at least one category associated with the new content.

4. The method as recited in claim 1, further comprising the steps of said first editor reviewing said additional comments to determine if said additional comments include specific content revision suggestions and determining whether to award points to said contributing member within a third predefined range.

5. The method as recited in claim 4, further comprising the steps of said first editor reviewing said additional comments to determine if said additional comments include new content for said at least one category and determining whether to award points to said contributing member within a fourth predefined range.

6. The method as recited in claim 5, further comprising the steps of said first editor reviewing said additional comments to determine if said additional comments include general comments for said at least one category and determining whether to award points to said contributing member within a fifth predefined range.

7. The method as recited in claim 6, further comprising the steps of a second editor of said group receiving a higher level of authorization than said first editor and said second editor reviewing activity of said first editor and determining whether to award points to said first editor within a sixth predetermined range.

8. The method as recited in claim 7, further comprising the step of said second editor reviewing said edited category of editorially-controlled content prior to being published.

9. The method as recited in claim 1, further comprising the step of at least one member of said group receiving bonus points based in part on an amount of times their published comments have been viewed by at least one other member of the group.

10. The method as recited in claim 1, further comprising the step of one or more members of said group receiving reports of specific subject matter expertise members have based at least in part on said at least one member received points.

11. The method as recited in claim 1, further comprising the step of at least one member of said group receiving a form of recognition for received points as part of a contest.

12. The method as recited in claim 1, further comprising the step of said contributing member receiving awarded points of a default value in absences of said first editor awarding points for said contributing member's contribution.

13. The method as recited in claim 12, wherein said contribution points are further based in part on a weighting of said awarded points using said rating.

14. A computer implemented method for information editorial controls, wherein a program stored on a non-transitory computer-readable storage medium instructs a processor to perform the method consisting of:

steps for a group of members in an online community receiving authorization to view a category of editorially-controlled content, view published comments, add additional comments, add further comments to said published comments, and rate said published comments;

steps for a first editor of said group in said online community receiving authorization to publish said at least one category of editorially-controlled content, review said additional and further comments, incorporate said additional and further comments into said at least one category of editorially-controlled content and assign points within a predefined range for ratings of said comments exceeding a predetermined level to a member contributing additional comments and a member contributing further comments, in which said assigned points identify subject matter expertise for said member contributing additional comments and said member contributing further comments in said category;

steps for a member of said group rating published comments;

steps for a contributing member of said group submitting additional comments;

steps for said first editor reviewing said additional comments and awarding points to said contributing member for ratings of said comments exceeding a predetermined level, in which said assigned points identify subject matter expertise for said member contributing additional comments in said category;

steps for said first editor incorporating suitable additional comments into said at least one category of editorially-controlled content; and steps for at least one member of said group receiving contribution points.

15. The method as recited in claim 14, further comprising steps for a second editor of said group receiving a higher level of authorization than said first editor and reviewing activity of said first editor.

16. The method as recited in claim 15, further comprising steps for said second editor reviewing said edited category of editorially-controlled content.

17. The method as recited in claim 14, further comprising steps for reviewing and determining the amount of points to award a contributing member's editorially controlled content revision.

18. The method as recited in claim 14, further comprising steps for reviewing and determining the amount of points to award a contributing member's new contribution of editorially controlled content.

19. The method as recited in claim 14, further comprising steps for at least one members of said group receiving bonus points.

20. The method as recited in claim 14, further comprising steps for one or more members of said group receiving reports of specific subject matter expertise members have.

21. The method as recited in claim 14, further comprising steps for one or more members of said group receiving a form of recognition as part of a contest.

22. The method as recited in claim 14, further comprising steps for said contributing member receiving awarded points of a default value.

23. A non-transitory computer-readable storage medium with an executable program stored thereon, wherein the program instructs a processor to perform the following steps:

a at least one in a group of members in an online community receiving authorization to view a category of editorially-controlled content, view published comments on said at least one category from one or more members of said group, add additional comments to said at least one category, add further comments to said published comments and rate said published comments;

a first editor of said group in said online community receiving authorization to publish said at least one category of editorially-controlled content, review said additional and further comments, incorporate said additional and further comments into said at least one category of editorially-controlled content and assign points within a predefined range for ratings of said comments exceeding a predetermined level to members contributing additional comments and members contributing further comments, in which said assigned points identify subject matter expertise for said member contributing additional comments and said member contributing further comments in said category;

a member of said group rating said published comments within a first predefined range;

a contributing member of said group submitting said additional comments;

said first editor reviewing said additional comments to determine suitability for incorporation of said additional comments into said at least one category of editorially-controlled content and determining whether to award points to said contributing member within a second predefined range;

said first editor incorporating suitable additional comments into said at least one category of editorially-controlled content and publishing an edited category of editorially-controlled content wherein said suitable submitted comments improves the content of said at least one category; and one or more members of said group receiving contribution points based in part on their awarded points and rating of their published comments.

24. The program instructing the processor as recited in claim 23, further comprising the step of said first editor reviewing said additional comments to determine if said additional comments include specific content revision suggestions and determining whether to award points to said contributing member within a third predefined range.

25. The program instructing the processor as recited in claim 24, further comprising the step of said first editor reviewing said additional comments to determine if said additional comments include new content for said at least one category and determining whether to award points to said contributing member within a fourth predefined range.

26. The program instructing the processor as recited in claim 25, further comprising the step of said first editor reviewing said additional comments to determine if said additional comments include general comments for said at least one category and determining whether to award points to said contributing member within a fifth predefined range.

27. The program instructing the processor as recited in claim 26, further comprising the step of a second editor of said group receiving a higher level of authorization than said first editor and said second editor reviewing activity of said first editor and determining whether to award points to said first editor within a sixth predetermined range.

28. The program instructing the processor as recited in claim 27, further comprising the step of said second editor reviewing said edited category of editorially-controlled content prior to being published.

29. The program instructing the processor as recited in claim 23, further comprising the step of one or more members of said group receiving bonus points based in part on an amount of times their published comments have been viewed by at least one other member of the group.

30. The program instructing the processor as recited in claim 23, further comprising the step of one or more members of said group receiving reports of specific subject matter expertise members have based in part on said members received points.

31. The program instructing the processor as recited in claim 23, further comprising the step of one or more members of said group receiving a form of recognition for received points as part of a contest.

32. The program instructing the processor as recited in claim 23, further comprising the step of said contributing member receiving awarded points of a default value in absences of said first editor awarding points for said contributing member's contribution.

33. The program instructing the processor as recited in claim 32, wherein said contribution points are further based in part on a weighting of said awarded points using said rating.

34. The program instructing the processor as recited in claim 23, further comprising the step of reviewing and determining the amount of points to award a contributing member's editorially controlled content revision.

35. The program instructing the processor as recited in claim 23, further comprising the step of reviewing and determining the amount of points to award a contributing member's new contribution of editorially controlled content.

36. A system for information editorial controls, the system comprising:

one or more processing units being configured for one or more in a group of members in an online community receiving authorization to view a category of editorially-controlled content, view published comments, add additional comments, add further comments to said published comments, and rate said published comments;

one or more processing units being configured for a first editor of said group in said online community receiving authorization to publish said at least one category of editorially-controlled content, review said additional and further comments, incorporate said additional and further comments into said at least one category of editorially-controlled content and assign points within a predefined range for ratings of said comments exceeding a predetermined level to a member contributing additional comments and a member contributing further comments, in which said assigned points identify subject matter expertise for said member contributing additional comments and said member contributing further comments in said category;

one or more processing units being configured for a member of said group rating published comments;

one or more processing units being configured for a contributing member of said group submitting additional comments;

one or more processing units being configured for said first editor reviewing said additional comments and awarding points to said contributing member for ratings of said comments exceeding a predetermined level, in which said assigned points identify subject matter expertise for said member contributing additional comments in said category;

one or more processing units being configured for said first editor incorporating suitable submitted comments into said at least one category of editorially-controlled content; and one or more processing units being configured for one or more members of said group receiving contribution points.

37. The system as recited in claim 36, further comprising one or more processing units being configured for a second editor of said group receiving a higher level of authorization than said first editor and reviewing activity of said first editor.

38. The system as recited in claim 37, further comprising one or more processing units being configured for said second editor reviewing said edited category of editorially-controlled content.

39. The system as recited in claim 36, further comprising one or more processing units being configured for one or more members of said group receiving bonus points.

40. The system as recited in claim 36, further comprising one or more processing units being configured for one or more members of said group receiving reports of specific subject matter expertise members have.

41. The system as recited in claim 36, further comprising one or more processing units being configured for one or more members of said group receiving a form of recognition as part of a contest.

42. The system as recited in claim 36, further comprising one or more processing units being configured for said contributing member receiving awarded points of a default value.

* * * * *